United States Patent [19]

Isenberg

[11] 4,054,729
[45] Oct. 18, 1977

[54] RECHARGEABLE HIGH TEMPERATURE ELECTROCHEMICAL BATTERY

[75] Inventor: Arnold O. Isenberg, Monroeville, Pa.

[73] Assignee: Westinghouse Electric Corporation, Pittsburgh, Pa.

[21] Appl. No.: 735,922

[22] Filed: Oct. 27, 1976

[51] Int. Cl.² ............................................. H01M 6/36
[52] U.S. Cl. ................................. 429/112; 429/199
[58] Field of Search ................. 429/112, 191, 199, 218

[56] References Cited

U.S. PATENT DOCUMENTS

| 3,607,402 | 9/1971 | Buzzelli | 429/112 |
| 3,980,495 | 9/1976 | Roche et al. | 429/112 X |

Primary Examiner—C. F. LeFevour
Attorney, Agent, or Firm—D. P. Cillo

[57] ABSTRACT

A rechargeable, high temperature, electrochemical cell is made, comprising an anode containing an intermetallic compound of magnesium with silicon or magnesium with boron, a cathode containing a metal sulfide and a contacting, fused halide salt electrolyte, containing magnesium ions disposed between the anode and cathode.

11 Claims, 2 Drawing Figures

RECHARGEABLE HIGH TEMPERATURE ELECTROCHEMICAL BATTERY

BACKGROUND OF THE INVENTION

A variety of batteries employing metallic magnesium anodes are known. Morehouse et. al., in U.S. Pat. No. 2,759,986, taught a magnesium anode cup container lined with a cathode material paste consisting of powdered sulfur, graphite, and magnesium bromide electrolyte. Roche et. al. in Argonne National Lab, ERDA Report No. 76-35, "Alternative Secondary Cell Systems", Progress Report, 1976, pp. 53 to 54, discloses a molten electrolyte, magnesium-iron sulfide cell, using $FeS_2$ cathodes, and $MgCl_2$ — NaCl — KCl electrolyte. The cathode was covered with a stainless steel screen and the anode was covered with graphite fabric. The cell operated at 450° C but short circuited after four cycles due to magnesium dendrite formation.

Others in the art have substituted iron sulfide as the cathode material in combination with a lithium anode. These lithium cells provide outstanding high voltage characteristics. Vissers et. al., in U.S. Pat. No. 3,933,521, taught a molten electrolyte, rechargeable, electrochemical cell which required a LiCl — KCl electrolyte between the anode and cathode and operated at temperatures of about 400° C. The cathode contains iron, cobalt or copper sulfides in a conductive support structure, insulated with a separate boron nitride or yttria cloth separator, and disposed in the center of a housing container. The anode which lines the bottom of the container comprises a 90% porous, compacted, stainless steel or nichel felt, coated with cobalt and impregnated with molten lithium.

The use of lithium, due to its high reactivity, requires the use of expensive separator and container materials. In lithium cells, the anode and electrolyte are very expensive. The use of magnesium metal provides severe short circuit complications due to dendritic growth at the magnesium electrode during recharging. Magnesium also reacts chemically with a wide variety of separator materials, particularly oxides, to make them electrically conducting, thus causing shorting of electrodes. What is needed, is an inexpensive, secondary, electrochemical cell, which will still provide good voltage characteristics, and which will not be easily degraded over long time periods.

SUMMARY OF THE INVENTION

The above problems are solved by providing a new and improved rechargeable, high temperature battery, based on a magnesium silicide-iron sulfide or a magnesium boride-iron sulfide couple. As a substitute for iron sulfide a variety of other metal sulfides; such as, for example, nickel sulfide and copper sulfide can be used. The anode and cathode operate within a secondary electrochemical cell at temperatures of between about 400° C to about 650° C. A non-aqueous, fused halide salt electrolyte, containing at least magnesium halide, preferably impregnated into a MgO, $Al_2O_3$, CaF, BN or $ZrO_2$ corrosion and heat resistant fiber or powder matrix, is disposed between the anode and cathode, which have suitable electrical connections attached thereto. Two or more cells can be electrically connected to form a high specific energy, long cycle life battery. The use of an intermetallic compound, such as reaction products of magnesium with silicon, or magnesium with boron as an active battery material, provides an inexpensive cell with good electrical characteristics; and the use of a suitable electrolyte matrix solves problems of electrode swelling.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
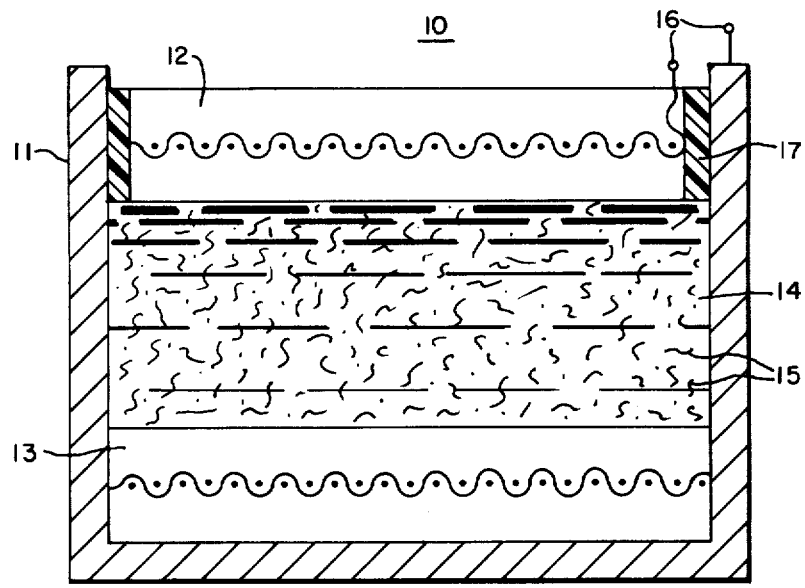
FIG. 1 shows an elevational view in cross section of one embodiment of the secondary, high temperature cell of this invention.

Referring now to FIG. 1, one embodiment of a battery cell 10 is shown. The container 11 may be made from steel, stainless steel, nickel or other suitable material having a melting point over about 800° C. It can have a cylindrical or box configuration. The anode 12 can be a sintered nickel powder plaque having a central grid of wire or fibers, or preferably, a pressed or diffusion bonded fiber metal plaque, as taught by Brown et. al. in U.S. Pat. No. 3,895,960, herein incorporated by reference. In both of these cases a magnesium compound is deposited within the plaque structure.

The preferred fiber metal plaque is between about 75% to about 95% porous and can be made of compacted, contacting, iron, steel wool, or nickel fibers, about 0.0002 inch to 0.015 inch in diameter. The fibers are preferably pressed or metallurgically diffusion bonded, rather than melted together, and a uniform, thin coating of nickel metal may optionally be plated onto the iron or steel wool fibers after the fibers are pressed or bonded together. This fiber metal plaque can then be sintered to a low carbon steel sheet to provide further support and increased electrical conductivity.

The anode contains a magnesium containing active battery material. In one method of making the magnesium containing anode battery material, silicon powder or boron powder is deposited into the porous plaque structure by a slurry pasting technique. The semi-dried plaque is pressed to further consolidate and size the plaque to the desired thickness. The plaque is further dried and then submerged in a water free magnesium chloride containing salt bath and connected as cathode to a D.C. power source. A solid sheet or rod of magnesium serves as anode. A current flow will result in electroplating of magnesium on the powders and the formation of the desired magnesium silicide or magnesium boride compounds. The plating temperature is below the melting point of magnesium. With a known silicon or boron content in the plaque, any ratio of silicon-magnesium and boron-magnesium can be established by measuring the charge transfer.

In the second method of preparing the magnesium containing anode material, used in Example 1, silicon or boron powder is deposited in the porous plaque structure by a slurry pasting technique as described above, however, the magnesium is introduced by covering the plaque with a thin magnesium sheet of known weight and placing this sandwich into the final cell arrangement. By placing the cell in a molten salt electrolyte, such as $MgCl_2$ — NaCl at about 500° C, magnesium from the metal will diffuse to and react with a substantial portion of the silicon or boron powder, to result in the formation of the desired magnesium silicide or magnesium boride compounds.

A third method of anode preparation is the formation of magnesium silicide or magnesium boride in powder form. This is then pasted by a slurry technique into the plaque structure. Here, appropriate mixtures of magnesium with silicon or boron are compacted and heated in an oxygen free atmosphere or vacuum to form the desired compounds. These powders are then ball milled in an inert liquid carrier such as benzene or toluene and the resulting slurry pasted into the plaque structure. The plaque is then dried and sized.

All of these reaction methods will provide active battery material comprising an intermetallic reaction compound of magnesium with silicon or magnesium with boron. All of these compounds are magnesium silicides or magnesium boride compounds, and those terms are understood to include all such reaction products. Two of the stoichiometric forms would be MgSi or $Mg_2Si$. Another stoichiometric form would be $MgB_6$. These magnesium silicides and magnesium borides provide excellent active materials, and reduce the cell electrochemical activity, to provide a longer lifetime for the cell components especially the separator material. Upon discharge, silicon or boron remains at the anode and MgS forms at the cathode. Upon recharging, the magnesium recombines with the silicon or boron so that dendrites are not formed and short circuiting possibilities are eliminated. Any other means of dispersing the magnesium containing materials within the porous conducting support structure can be used to provide an anode.

The cathode 13 can be a sintered nickel powder plaque, or preferably, a pressed or diffusion bonded fiber metal plaque, which can then be sintered to a low carbon steel sheet, as described in detail hereinabove. In both of these cases, the metal sulfide, which may include iron sulfide, nickel sulfide, copper sulfide or their mixtures, is deposited within the plaque structure. The sulfides are usually deposited in an aqueous slurry form, comprising particles having an average particle size of between about 0.1 micron to about 50 microns. Within this range, the properties of good sulfide surface area, allowing maximum electrochemical interaction, and good impregnation characteristics are optimized.

Preferably the sulfides will be present in the range of about 10 vol.% to about 70 vol.% of the plaque. The cathode 14 may also be made of a porous sintered metal sulfide powder construction. The term "sulfide" is taken to comprise, for example, the stable crystallographically defined sulfides, for example, $FeS$, $FeS_2$, $NiS$, $NiS_2$, $CuS$ and $CuS_2$.

The electrolyte 14 can be any suitable eutectic halide salt mixture that is molten at the operating temperature of the cell and contains magnesium ions in the form of a magnesium halide, preferably $MgCl_2$. Suitable fused salt mixtures containing magnesium ions and alkali metal halide salts would include, preferably, $MgCl_2$ — NaCl; $MgCl_2$ — NaCl — $CaF_2$; $MgCl_2$ — NaCl — LiCl; and $MgCl_2$ — NaCl — KCl, among others.

In the embodiment shown in FIG. 1, the electrolyte is impregnated into a suitable oxide, fluoride or boron nitride matrix 15, which is preferably in powder or fiber form. The useful oxide, fluoride, or nitride, serving as electrolyte matrix and electrode separator must be heat resistant materials effective to resist temperatures between about 400° C and 650° C without reacting with fused halide salt mixtures and include, for example MgO, $Al_2O_3$, $CaF_2$, BN and $ZrO_2$.

The matrix generally constitutes between about 5 to 50 percent of the volume between the anode and cathode. Other suitable high temperature separator materials can also be used to provide a powder or fiber matrix for the molten electrolyte. The lowest useful operating temperature of this cell is limited by the melting point of the mixed halide electrolyte. The average operating temperature was about 400° C. Electrical connections 16 are shown as well as an insulating ring 17 between the anode and the container. Two or more of these cells 10, can be electrically connected, to provide a rechargeable, high temperature battery. Other suitable cell configurations than the embodiment shown can of course be used.

EXAMPLE 1

A secondary, high temperature Mg silicide/FeS electrochemical cell, similar to that shown in FIG. 1 of the drawings was constructed. An anode sheet was made from 92% porous, compacted steel wool sintered to low carbon steel sheet. The steel wool fibers were about 0.0008 inch in diameter and about 0.5 inch long. The anode was about 2 m.m. thick and had a surface area of 6.6 sq. cm. It was pasted with about 0.85 gram of silicon powder and then contacted with a magnesium sheet. This pasted plaquemagnesium sheet structure was then placed in a $MgCl_2$ — NaCl bath at about 500° C, as described in the second method of preparation, hereinabove. This procedure provided a magnesium silicide reaction product compound within the interstices of the plaque support, from reaction of the magnesium metal from the sheet with the silicon powder. The anode contained about 0.85 grams of silicon powder and about 0.59 grams of magnesium.

A cathode sheet was made from 92% porous steel wool, having the same dimensions as described above, sintered to low carbon steel sheet. The cathode was about 2 m.m. thick. It was impregnated with an aqueous slurry of FeS powder having an average particle size of about 5 microns diameter. The resulting loaded cathode contained about 1.84 grams of FeS. A 1¼inch cylindrical steel container about 1 inch high was used as the cell enclosure.

The cathode sheet was a 6.6 sq. cm. area disk that was placed in contact with the bottom of the container, with the container being the cathode terminal. A eutectic salt electrolyte, consisting of $MgCl_2$ — NaCl was vacuum melted into the electrode-$ZrO_2$ fiber felt sandwiched at 600° C. The fiber matrix constituted about 10 vol.% of the electrolytematrix material. The anode sheet was provided with an alumina insulating ring edge, and placed on top of the electrolyte-matrix material, to provide an electrochemical cell with suitable electrical connections.

This cell was then connected to a power supply. The cell was heated by an external furnace to about 500° C, at which point the electrolyte was in molten form. The cell was cycled by alternately charging and discharging it at a constant current density of 60 mA./cm.² and discharging it at a constant current density of 60 mA./cm.².

Figure 2:
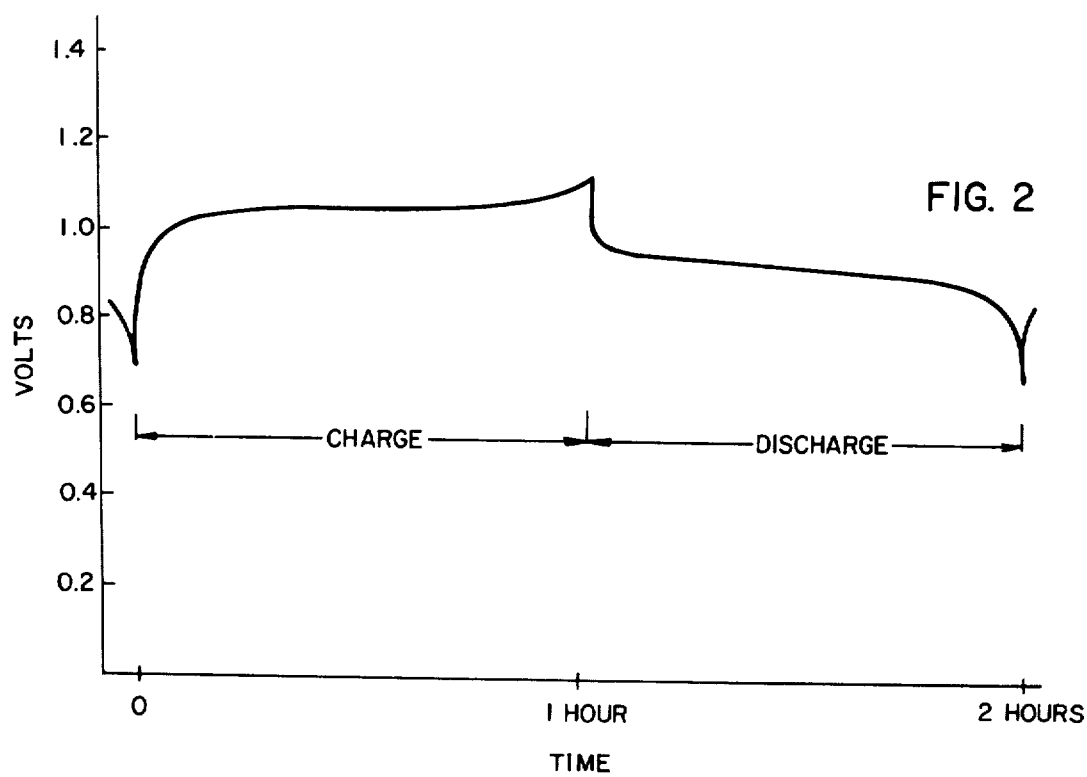
FIG. 2 shows a typical cell discharge characteristic, plotting cell voltage vs. time.

The cell charge and discharge characteristic was similar to that shown in FIG. 2 of the drawings, indicating that the cell was a very useful electrochemical power source. The cell was taken apart after 20 cycles and showed no dendritic growth. To make a battery a series of these cells would be electrically connected.

Similar results were obtained with alumina and magnesia electrolyte matrices replacing zirconia. The cathodes in these instances were made the limiting electrode and 99% of the FeS was utilized on charge and on discharge. The utilization of magnesium in the magnesium silicide was 85%. The preparation of a magnesium boride-FeS cell is similar to that of a cell containing magnesium silicide, both silicon and boron being commercially available in powder form.

I claim:

1. A rechargeable, high temperature, electrochemical cell, comprising an anode containing a battery active material selected from the group consisting of intermetallic compounds of magnesium with silicon and magnesium with boron, a cathode containing a metal sulfide, and a contacting fused halide salt electrolyte containing magnesium ions therebetween, said anode and cathode having attached electrical connections.

2. The rechargeable, high temperature electrochemical cell of claim 1, wherein the anode has a porous metal fiber structure, the electrolyte is disposed in a heat resistant matrix material, said matrix material being in powder of fiber form, constituting between about 5 vol.% to about 50 vol. % of the electrolyte-matrix composition, and is selected from the group consisting of MgO, Al$_2$O$_3$, CaF, BN, ZrO$_2$ and mixtures thereof, and the intermetallic compound is selected from the group consisting of magnesium silicide and magnesium boride.

3. The rechargeable, high temperature electrochemical cell of claim 1, wherein the cathode has a porous metal fiber structure having between about 10 vol.% to about 70 vol.% of sulfide materials disposed therein.

4. The rechargeable, high temperature electrochemical cell of claim 2, wherein the electrolyte contains Mg halide impregnated within a matrix material of ZrO$_2$, and the metal sulfide is selected from the group consisting of iron sulfide, nickel sulfide, copper sulfide and mixtures thereof.

5. The rechargeable, high temperature, electrochemical cell of claim 4, wherein the metal sulfide consists of particles of iron sulfide having an average particle size of between about 0.1 micron to 50 microns.

6. The rechargeable, high temperature electrochemical cell of claim 5, wherein the electrolyte is selected from the group consisting of salt mixtures of MgCl$_2$ — NaCl, MgCl$_2$ — NaCl — CaF$_2$, MgCl$_2$ — LiCl, and MgCl$_2$ — NaCl — KCl and the battery material in the anode comprises magnesium silicide.

7. A plurality of the cells of claim 5 electrically connected to form a battery.

8. A rechargeable, electrochemical cell, operating at a temperature of between about 400° C to about 650° C, comprising an anode containing a battery active material selected from the group consisting of intermetallic compounds of magnesium with silicon and magnesium with boron, a cathode containing iron sulfide, and a contacting molten halide salt electrolyte therebetween containing magnesium ions disposed in a matrix of heat resistant materials selected from the group consisting of MgO, Al$_2$O$_3$, CaF, BN, ZrO$_2$ and mixtures thereof in powder or fiber form, said matrix constituting between about 5 vol.% to about 50 vol.% of the electrolyte-matrix composition, all enclosed in a heat resistant container, said anode and cathode having attached electrical connections.

9. The rechargeable, electrochemical cell of claim 8, wherein the anode has a porous metal fiber structure, and the cathode has a porous metal fiber structure having between about 10 vol.% to about 70 vol.% of iron sulfide disposed therein.

10. The rechargeable, electrochemical cell of claim 9, wherein the electrolyte is selected from the group consisting of molten salt mixtures of MgCl$_2$ — NaCl, MgCl$_2$ — NaCl — CaF$_2$, MgCl$_2$ — NaCl — LiCl, and MgCl$_2$ — NaCl — KCl and the battery material in the anode is magnesium silicide.

11. The rechargeable, electrochemical cell of claim 9, wherein the battery material on the anode is magnesium boride.

* * * * *